United States Patent Office 3,124,609
Patented Mar. 10, 1964

3,124,609
UNSATURATED ESTER PURIFICATION
Buster W. Higdon, Pampa, Tex., assignor to Celanese Corporation of America, New York, N.Y., a corporation of Delaware
No Drawing. Filed Oct. 8, 1959, Ser. No. 845,091
14 Claims. (Cl. 260—486)

This invention relates to a method of purifying crude unsaturated esters. More particularly, this invention deals with the removal of carbonyl impurities such as biacetyl and other diketones from unsaturated esters, particularly from esters of acrylic acid and the lower alcohols.

One method for making acrylic acid esters utilizes the reaction of beta-propiolactone (in either its monomeric or polymeric form, or mixture of monomer and polymer) with an alcohol. This reaction may be illustrated as follows:

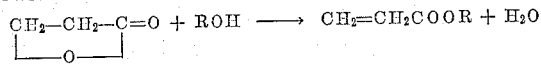

where R is a lower alkyl group, e.g. having 1 to 8 carbon atoms, such as methyl or ethyl.

The carrying out of the above reaction results, however, in a complex mixture of products. In addition to the desired acrylate ester there are also obtained significant amounts of side reaction products as well as impurities ordinarily present in the feed stocks. For example, the reaction of methyl alcohol with beta-propiolactone results in a mixture of products including the desired methyl acrylate, carbonyl impurities such as biacetyl, and other side reaction products and feed contaminants such as acrylic acid, methyl alcohol and water.

The presence of carbonyl impurities, particularly vicdiketones such as biacetyl, is very undesirable. Biacetyl is a high color compound and its presence even in comparatively minute amounts (e.g. 10 p.p.m.) causes the crude ester mixture to have a yellowish color. Since monomeric esters such as methyl acrylate and ethyl acrylate are used in the formation of polymeric materials, it is desirable that such monomers be used in their natural colorless state, in order to obtain high quality polymers. This requires the removal of the biacetyl and other high color compounds.

The usual distillation techniques for separation of the carbonyl impurities from the ester are not very satisfactory. For example, when dealing with a mixture of methyl acrylate and biacetyl, distillation to remove all of the small amount of biacetyl is diffcult because the ester and the biacetyl have very similar boiling point ranges. Moreover, when distillation is attempted, an undesirable degree of polymerization of the unsaturated monomer tends to take place. This causes wastage of monomer as well as difficulty in the controlling of subsequent polymerization.

Acrylate esters may also be prepared, for example, by direct esterification of the desired acid with the desired alcohol. Regardless of which of these processes is used, however, the resulting ester mixture may contain yellowish carbonyl impurities which must be removed.

One object of this invention is to provide a method of obtaining relatively pure unsaturated ester monomers.

Another object is to provide a simple method for removing carbonyl impurities such as biacetyl from a mixture containing an unsaturated ester.

A further object is to provide a method for separating such monomeric esters from carbonyl impurities without causing appreciable polymerization of the ester monomer.

In accordance with one aspect of the invention, the crude mixture containing the unsaturated monomeric ester, carbonyl impurity such as biacetyl, and other side reaction products and impurities is treated with an amine or amine salt. Suitable amines include ortho-phenylenediamine, hydroxyl amine, the mineral acid salts of hydroxyl amine (e.g. hydroxylamine acid sulfate), semicarbazide, 2,4-dinitrophenylhydrazine, phenyl hydrazine and hydrazine.

The treatment of the crude mixture containing the desired unsaturated ester and carbonyl impurity, e.g. biacetyl, with the amine compound results in the formation of a biacetylamine complex. This complex has a considerably higher boiling point range than that of the unsaturated ester monomer, so that it can readily be separated therefrom, as by distillation, without undue polymerization of the ester monomer. The purified and substantially colorless unsaturated ester monomer is collected in the distillate.

The complexing of the carbonyl impurities may be conveniently carried out by treating the crude mixture with a solution of the amine compound. Typical suitable solvents include water, methanol, higher boiling ethers, hydrocarbons, alcohols, and esters (including the same ester that is being purified).

In the preparation of esters of acrylic acids by the reaction of beta-propiolactone and a lower alcohol, the crude mixture from the reactor overhead will contain the acrylate ester, crabonyl impurities, free acrylic acid, and various side reaction products. If desired, the carbonyl impurities may be complexed and separated at this point by treatment of the crude mixture with amine solution and subsequent distillation. Alternatively, the crude mixture from the reactor overhead may first be passed upwardly through an extractor tower and treated with water containing the amine to remove water-solubles such as acrylic acid and methanol and the carbonyl as the amine complex. The extraction of the water-solubles may be followed by treatment of the extractor overhead with amine solution and then distilling. As another alternative, the extractor tower overhead, which will contain volatile constituents, e.g. alcohols and lower esters that must be removed from the acrylate, may first be introduced into a distilling column for removal of such volatiles. The residue is treated with amine solution to form the carbonyl complex.

In a preferred embodiment of this invention the crude mixture containing desired unsaturated ester monomer, carbonyl impurities, unreacted acid, side reaction products, and other impurities is first treated with an amine solution to form the carbonyl-amine complex. The mixture is then treated with a basic compound such as aqueous sodium bicarbonate, which neutralizes any unreacted acid. The water phase and organic phase are separated and the organic phase distilled, the colorless purified unsaturated ester monomer being collected in the distillate.

The pH for the amine solution should preferably be kept below 7. A preferred pH range for hydroxylamine is from 3.5 to 4.5.

Appreciable polymerization of the unsaturated ester monomer may conveniently be prevented by the addition of a minute quantity of an inhibitor, e.g. hydroquinone, to the crude mixture. The hydroquinone's inhibiting action is not adversely affected upon the addition of the amine solution. The concentration of inhibitor may be conveniently about 0.01 to 0.1% by weight.

The folowing examples will further illustrate this invention. All parts are by weight unless otherwise indicated.

*Example 1*

500 parts of the crude volatile reaction product of beta-propiolactone and methyl alcohol, which reaction product contained 0.1% of hydroquinone, were agitated in a mechanical shaker with a solution of 2.5 parts of hydroxylamine in 75 parts of water for 15 minutes. 20 parts of sodium bicarbonate in 250 parts of water were added to the mixture and the agitation continued for an additional twenty minutes, the bicarbonate serving to neutralize any free acrylic acid. The temperature during the entire thirty-five minutes was maintained at 25° C. The contents of the flask were decanted into a separatory funnel and permitted to stand for 15 minutes, after which the organic phase and water phase were separated. The organic phase was flash distilled at atmospheric pressure. The distillate, containing mostly methyl acrylate, was essentially colorless. It gave an APHA color value of less than five, indicating virtually complete removal of the biacetyl.

*Example 2*

The procedure of Example 1 was repeated, the sole difference being the amount of hydroxylamine, which was 1.5 parts, rather than the 2.5 parts of Example 1. The color rating (APHA) of the distillate was again less than 5, indicating absence of biacetyl.

*Examples 3–6*

The following table gives data for various concentrations of the hydroxylamine hydrochloride and shows the use of water or water-methanol as a solvent. The crude mixture treated was the same as that used in Example 1.

| Example No. | Solvent | Hydroxylamine (Weight Percent)[1] | Residence Time[2] (min.) | Temp., °C. | pH | Color APHA Distillate |
|---|---|---|---|---|---|---|
| 3 | Water | 2.0 | 20 | 25 | 3.6 | <5 |
| 4 | ---do--- | 1.0 | 20 | 25 | 4.1 | <5 |
| 5 | Water/methanol in 5/1 volumetric ratio. | 0.5 | 20 | 25 | | <5 |
| 6 | ---do--- | 0.2 | 20 | 25 | | <5 |

[1] Based on the amount of crude mixture.
[2] Contact time on mechanical shaker.

*Example 7*

The distillate from Example 3 was evaporated and the residue weighed. The amount of methyl acrylate polymer was 0.117 weight percent.

*Example 8*

A mixture of 250 ml. of the same crude mixture as used in Example 1, 125 ml. of water, and one gram of hydroxylamine hydrochloride was refluxed for 24 hours. The organic layer was separated and checked for polymer by adding 2 ml. of 50 volume percent acetic acid in water to 100 ml. of the organic layer. No turbidity was noticed after five minutes, indicating that the polymer content was very low.

*Example 9*

500 ml. of a mixture of 65% methyl acrylate 25% methanol 10% water, and 0.05% biacetyl was agitated with 250 ml. of water and 5 g. of o-phenylenediamine at room temperature for 30 minutes. Then a solution of 20 grams of sodium bicarbonate in 150 ml. of water was mixed in. The mixture was allowed to separate into two layers and the non-aqueous layer was flash distilled. The distillate, methyl acrylate, had an APHA color of <5.

While the invention has been described more particularly for the purification of methyl acrylate, it may also be used for treatment of other acrylate esters, such as ethyl acrylate or other acrylates, e.g. acrylates of alcohols containing up to 8 carbon atoms, and the corresponding methacrylates to remove those carbonyl impurities which are not readily removed by distillation.

The invention finds its greatest utility for the treatment of mixtures containing at least about 50%, and preferably about 60 to 99% of the unsaturated ester, contaminated with less than about 1%, e.g. about 0.01 to 0.1% of the carbonyl impurity. Usually the difference in the boiling points of the unsaturated ester and the major carbonyl-containing impurity is less than about 15° C., e.g. about 5 to 10° C.

One suitable temperature range for the formation of the complex is about 20 to 60° C.

It is to be understood that the foregoing detailed description is merely given by way of illustration and that many variations may be made therein without departing from the spirit of my invention.

Having described my invention, what I desire to secure by Letters Patent is:

1. The process of removing ketone impurities from a crude mixture containing an unsaturated monomeric acrylic ester and ketone impurities, said process comprising treating the mixture with an amine compound selected from the group consisting of ortho-phenylene-diamine, hydroxylamine, hydroxylamine salts, semi-carbazide, 2,4-dinitrophenylhydrazine, phenyl hydrazine and hydrazine to thereby form a ketone-amine complex having a substantially higher boiling point than that of the unsaturated ester monomer and separating from the resulting mixture a purified unsaturated ester monomer.

2. The process of claim 1 wherein the ketone impurities comprise biacetyl.

3. The process of claim 1 wherein the unsaturated ester is selected from the group consisting of methyl acrylate, ethyl acrylate, methyl methacrylate and ethyl methacrylate.

4. The process of claim 1 wherein the amine is hydroxylamine.

5. The process of removing biacetyl from a crude mixture comprising an ester monomer selected from the group consisting of methyl acrylate, ethyl acrylate, methyl methacrylate, and ethyl methacrylate, this process comprising treating the crude mixture with an amine selected from the group consisting of hydroxylamine, hydroxylamine salts, semi-carbazide, 2,4-dinitrophenylhydrazine, phenyl hydrazine, hydrazine, and ortho phenylene diamine, to thereby form a high-boiling biacetyl-amine complex, distilling the thus treated mixture, and collecting the biacetyl-free ester monomer in substantially colorless form in the distillate.

6. The process of claim 5 wherein the ester is methyl acrylate.

7. The process of claim 6 wherein the amine compound is hydroxylamine hydrochloride.

8. The process of removing ketone impurities from a reaction product mixture obtained by the reaction of beta-propiolactone and a lower saturated aliphatic alcohol, said mixture containing at least 60% of a lower acrylate ester monomer and ketone impurities, comprising treating the mixture with an amine compound selected from the group consisting of ortho-phenylene-diamine, hydroxylamine, hydroxylamine salts, semi-carbazide, 2,4-dinitrophenylhydrazine, phenyl hydrazine and hydrazine to thereby form a ketone-amine complex having a substantially higher boiling point than the acrylate ester, distilling the thus treated mixture, and collecting the ketone-free acrylate monomer in substantially colorless form in the distillate.

9. The process of claim 8 wherein the ketone impurities comprise a vic-diketone.

10. The process of claim 8 wherein the ketone impurities comprise biacetyl.

11. The process of claim 8 wherein the amine is hydroxylamine.

12. The process of removing ketone impurities from a reaction product of beta-propiolactone and a lower saturated aliphatic alcohol, said mixture containing at least 60% of a lower acrylate ester monomer and ketone impurities, comprising treating the mixture with an amine compound selected from the group consisting of ortho-phenylene-diamine, hydroxylamine, hydroxylamine salts, semi-carbazide, 2,4-dinitrophenylhydrazine, phenyl hydrazine and hydrazine to thereby form a ketone-amine having a substantially higher boiling point than the acrylate ester, treating the mixture with an aqueous alkaline solution to thereby neutralize any acid present and extract water-solubles, separating the crude mixture phase containing acrylate ester monomer and ketone-amine complex from the aqueous phase, distilling the crude mixture, and collecting the carbonyl-free acrylate monomer in substantially colorless form in the distillate.

13. The process of claim 12 wherein the ketone impurities comprise vic-diketones.

14. The process of claim 13 wherein the vic-diketones comprises biacetyl.

References Cited in the file of this patent

UNITED STATES PATENTS

| | | |
|---|---|---|
| 1,963,968 | Burke et al. | June 26, 1934 |
| 2,138,763 | Graves | Nov. 29, 1938 |
| 2,314,443 | Crawford et al. | Mar. 23, 1943 |
| 2,456,647 | Rehberg et al. | Dec. 21, 1948 |
| 2,466,501 | Steadman et al. | Apr. 5, 1949 |
| 2,510,423 | Shaver | June 6, 1950 |
| 2,618,652 | Hollyday | Nov. 18, 1952 |
| 2,736,744 | Crawford et al. | Feb. 28, 1956 |

FOREIGN PATENTS

| | | |
|---|---|---|
| 810,221 | Great Britain | Mar. 11, 1959 |

OTHER REFERENCES

Haslam et al.: J. Appl. Chem. (London, 7, 24–32 (1957).

Rodd: "Chemistry of Carbon Compounds," vol. 1A, 1951, pages 512, 715–716, 720–721.